(12) United States Patent
Elbeery et al.

(10) Patent No.: US 8,190,906 B1
(45) Date of Patent: May 29, 2012

(54) METHOD AND APPARATUS FOR TESTING AUTHENTICATION TOKENS

(75) Inventors: Stephen Elbeery, Hampton Falls, NH (US); Brian Crossan, Wolfeboro, NH (US); Fu Xiang-Wu, Shirley, MA (US)

(73) Assignee: EMC Corporation, Hopkinton, MA (US)

( * ) Notice: Subject to any disclaimer, the term of this patent is extended or adjusted under 35 U.S.C. 154(b) by 833 days.

(21) Appl. No.: 12/336,393

(22) Filed: Dec. 16, 2008

(51) Int. Cl.
 *G06F 21/00* (2006.01)
 *H04L 29/06* (2006.01)
 *G06F 7/04* (2006.01)
 *G06F 15/16* (2006.01)
 *G06F 17/30* (2006.01)

(52) U.S. Cl. ............................ 713/185; 713/156; 726/7

(58) Field of Classification Search .................. None
 See application file for complete search history.

(56) References Cited

U.S. PATENT DOCUMENTS

| | | | |
|---|---|---|---|
| 5,812,666 A * | 9/1998 | Baker et al. ................... | 380/277 |
| 7,080,789 B2 | 7/2006 | Leaming | |
| 7,181,649 B2 | 2/2007 | Fruhauf et al. | |
| 7,350,705 B1 | 4/2008 | Frederick et al. | |
| 7,373,522 B2 | 5/2008 | Leaming | |
| 7,438,222 B2 | 10/2008 | Green et al. | |
| 2002/0112156 A1 * | 8/2002 | Gien et al. ..................... | 713/156 |
| 2005/0166263 A1 * | 7/2005 | Nanopoulos et al. ............. | 726/7 |
| 2006/0208066 A1 * | 9/2006 | Finn et al. ..................... | 235/380 |
| 2008/0256407 A1 * | 10/2008 | Selva et al. .................... | 714/732 |
| 2009/0006858 A1 * | 1/2009 | Duane et al. .................. | 713/185 |
| 2009/0031407 A1 * | 1/2009 | Kuang .............................. | 726/7 |
| 2009/0144556 A1 * | 6/2009 | Plet et al. ...................... | 713/185 |

* cited by examiner

*Primary Examiner* — Shin-Hon Chen
(74) *Attorney, Agent, or Firm* — BainwoodHuang

(57) ABSTRACT

A process and apparatus for automated testing of authentication tokens is disclosed which verifies the physical functioning of the tokens and the validity of the one-time passcodes (OTPs) displayed by the tokens during testing. The testing is automated to allow for large quantities of tokens to be tested in a single procedure, and also separates rejected tokens according to the particular failed test process identified with the token. In one embodiment, a rotary table is provided for testing, the table having multiple positions for performing different test procedures and for separating rejected tokens according to the particular test failed.

19 Claims, 6 Drawing Sheets

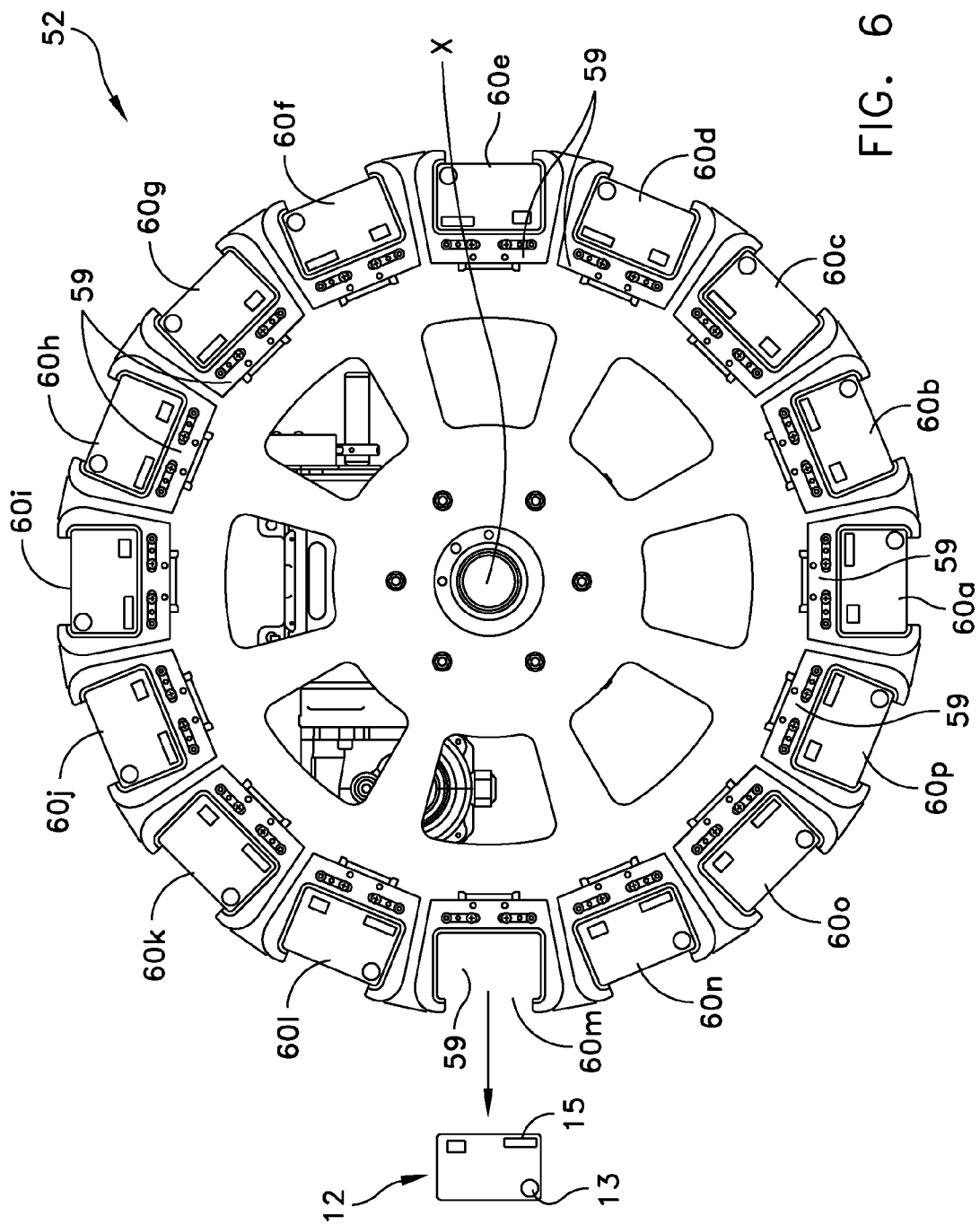

METHOD AND APPARATUS FOR TESTING AUTHENTICATION TOKENS

BACKGROUND

In general, a conventional authentication token is a device that creates one-time passcodes (OTPs) for use in authenticating a user to an authentication entity. To this end, the user activates the authentication token, e.g., by pressing a button. The authentication token then derives an OTP from a seed (or encryption key) and outputs the OTP, e.g., by displaying the OTP on a display to the user.

During a typical authentication session such as when the user wishes to obtain access to a resource (e.g., the user wishes to login to a website), the user provides the user-derived OTP to the authentication entity. The authentication entity compares the user-derived OTP with an independently-derived OTP for that user. If the user-derived OTP and the independently-derived OTP match, the user has successfully authenticated with the authentication entity and the authentication entity grants the user access to the resource. However, if the user-derived OTP and the independently-derived OTP do not match, authentication is unsuccessful and the authentication entity denies the user access to the resource.

Authentication tokens are available in a variety of different shapes and/or sizes. For example, some authentication tokens take the form of a keychain attachment. Other authentication tokens are credit-card shaped with a correspondingly thin profile. Yet other authentication tokens take the form of a small calculator. Many of these smaller and/or thinner sized tokens have the internal components laminated within the body of the token.

SUMMARY

Because the internal components of the tokens may be laminated within the card, for example in the thin, credit-card type tokens, if a token is improperly functioning the token cannot be opened without risking damage to the internal components. Thus, it is desirable to test the token prior to delivery to ensure that the token is operating properly. Likewise, if the token is not operating properly, it is desirable to determine the cause of the malfunction in order to correct the error and avoid such errors in the future.

One potential cause of such an error would be the erroneous matching of the RFID tag serial number in the token to that in the database causing the OTP displayed on the token not to match the expected passcode in the database. In such a case, the OTP itself would not function properly, and this could be an indication of a problem in the manufacturing process that could affect other tokens in the batch (i.e. the batch could all be out of sequence). If initially the OTP displayed matches the expected passcode, a malfunction could still be discovered if subsequent passcodes were not properly displayed, for example if a stuck or broken button on the token prohibited additional OTPs from being generated. Although some testing is capable of being performed by hand, such as the actuation of a button and reading of an OTP, the time taken and potential for human error makes such testing expensive and time consuming.

In order to test the tokens prior to delivery, and to identify potential issues within the manufacturing process, a method and apparatus is provided for testing authentication tokens to verify the accuracy of the OTPs displayed and to test the functionality of the tokens. The testing is automated to allow for large quantities of tokens to be tested in a single procedure, and also separates rejected tokens according to the particular failed test process identified with the token. Automation also allows for other manufacturing steps to be performed along with the testing, for example engraving serial numbers and additional programming, if desired.

In one embodiment, a rotary table is provided for testing, the table having multiple stations in order to hold the tokens and rotate the tokens into various positions for performing different test procedures. The rotary table may operate in conjunction with an input table that supplies the tokens to the rotary table, and a rejection table for receiving failed tokens. In one embodiment, the rejection table also separates rejected tokens according to the particular test failed into separate bins.

A variety of different tests may be performed on the tokens. In one embodiment, the rotary table moves the tokens between a station that initially scans and verifies an internal serial number in the token to a station that initiates the token's activation member to produce the OTP. Other testing may include an activation test where the activation member is initiated a second time to test to see if the OTP changes, failing the token if the first and second OTPs are not different. Other stations may be provided to optically read a serial number located on the token, or to engrave the serial number if one is not provided on the token. Additional stations may be left empty on the rotary table to provide for additional testing and/or manufacturing operations in the future, as desired.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 is a top plan view of a rotary table of the testing device of FIG. 5.

DETAILED DESCRIPTION

Figure 1:
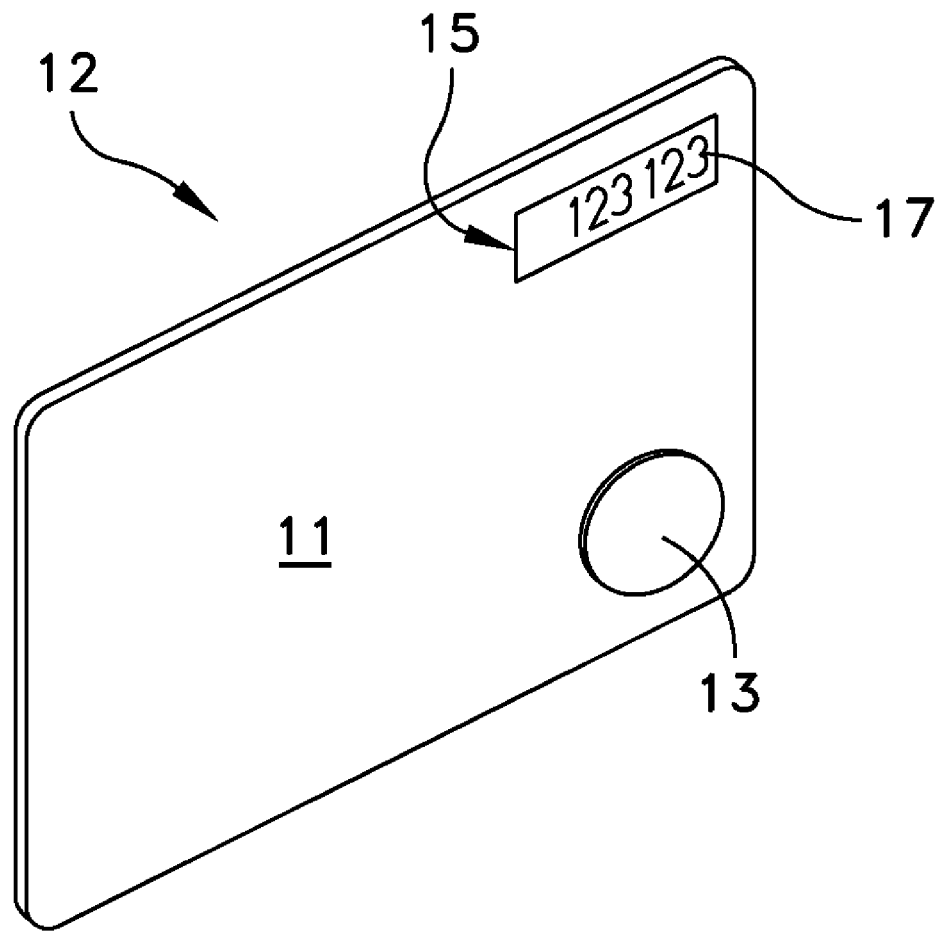
FIG. 1 is a perspective view of an exemplary prior art credit-card shaped token.

A process and apparatus for automated testing of authentication tokens is provided which verifies the physical functioning of the tokens and the validity of the one-time passcodes (OTPs) displayed by the tokens during testing. It should be understood that token described herein is an exemplary authentication token and although the description that follows is with respect to a generally rectangular, credit card shaped and sized token, the dimensions, shape and size of the token may be varied, and the testing method and apparatus may be utilized with any of a variety of tokens, as would be known to those of skill in the art. Likewise, although authentication tokens are described herein, the invention may also be used to house other types of cards, tokens, or similar items, for example smart cards, door access cards, other interactive devices, and the like, that produce a changing passcode, where it is desirable to test the devices prior to providing them to a user. An exemplary prior art token 12 is illustrated in FIG. 1 and includes an activation member, for example button 13, and display window 15 disposed on a face 11 of the token. As is known in the art, the button 13 is depressed in order to receive a one-time passcode (OTP) 17 which is displayed in window 15 in a prescribed order, as described herein above. Although token 12 includes a button 13 disposed on the face 11 of the token that is activated by a user to produce an OTP that is visible in display window 15, other elements may be utilized to display the OTP other than a button. In addition, some OTPs may not be physically visible but are readable in other manners, and the testing apparatus and method is applicable to these devices as well.

Figure 2:
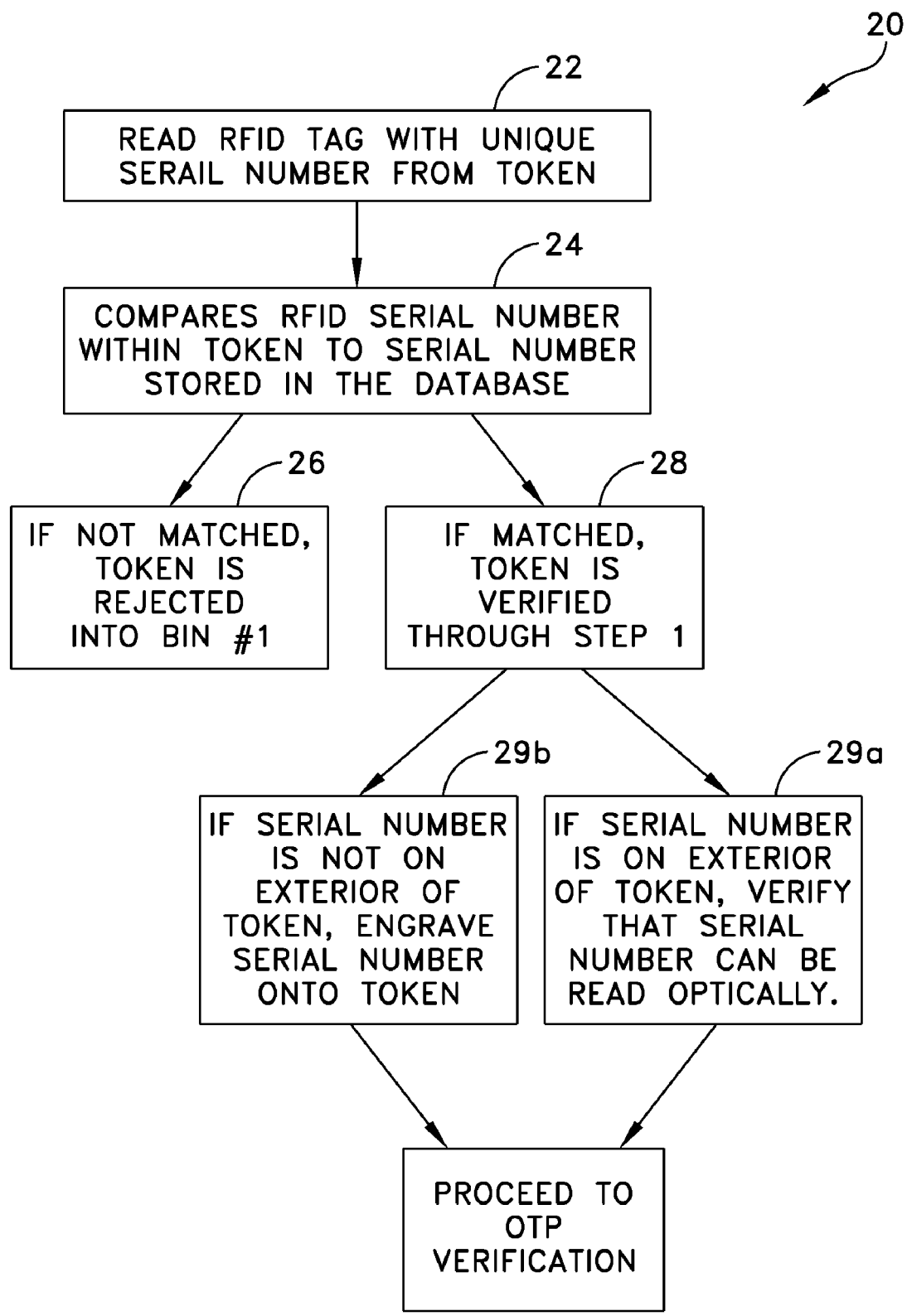
FIG. 2 is block diagram illustrating the process for verifying token serial numbers during authentication token testing.

Referring now to FIG. 2, an initial test procedure 20 for testing authentication tokens is illustrated. During this phase, the identification of the token 12 is verified against the expected identity of the token stored in the database. In the first step 22, the serial number housed within the token 12, for example by radio frequency identification (RFID), is scanned to determine the unique serial number of the RFID. The scanned unique serial number is then compared in step 24 to the serial number stored in the database to determine if the two are a match. If the serial number that is scanned does not match the serial number in the database, then the token is rejected and placed into a first bin in step 26. If, however, the serial number that is scanned does match the serial number in the database then the token is approved in step 28. If the token has a serial number already marked on the outside of the token, the marked serial number is confirmed in step 29a as being optically readable. If no serial number exists on the outside of the token, step 29b involves marking the outside of the token with the serial number, for example by etching the number into the back surface of the token. After the identity of the token is verified during the initial test procedure 20, the token can thereafter be tested to verify the OTP 17.

Figure 3:
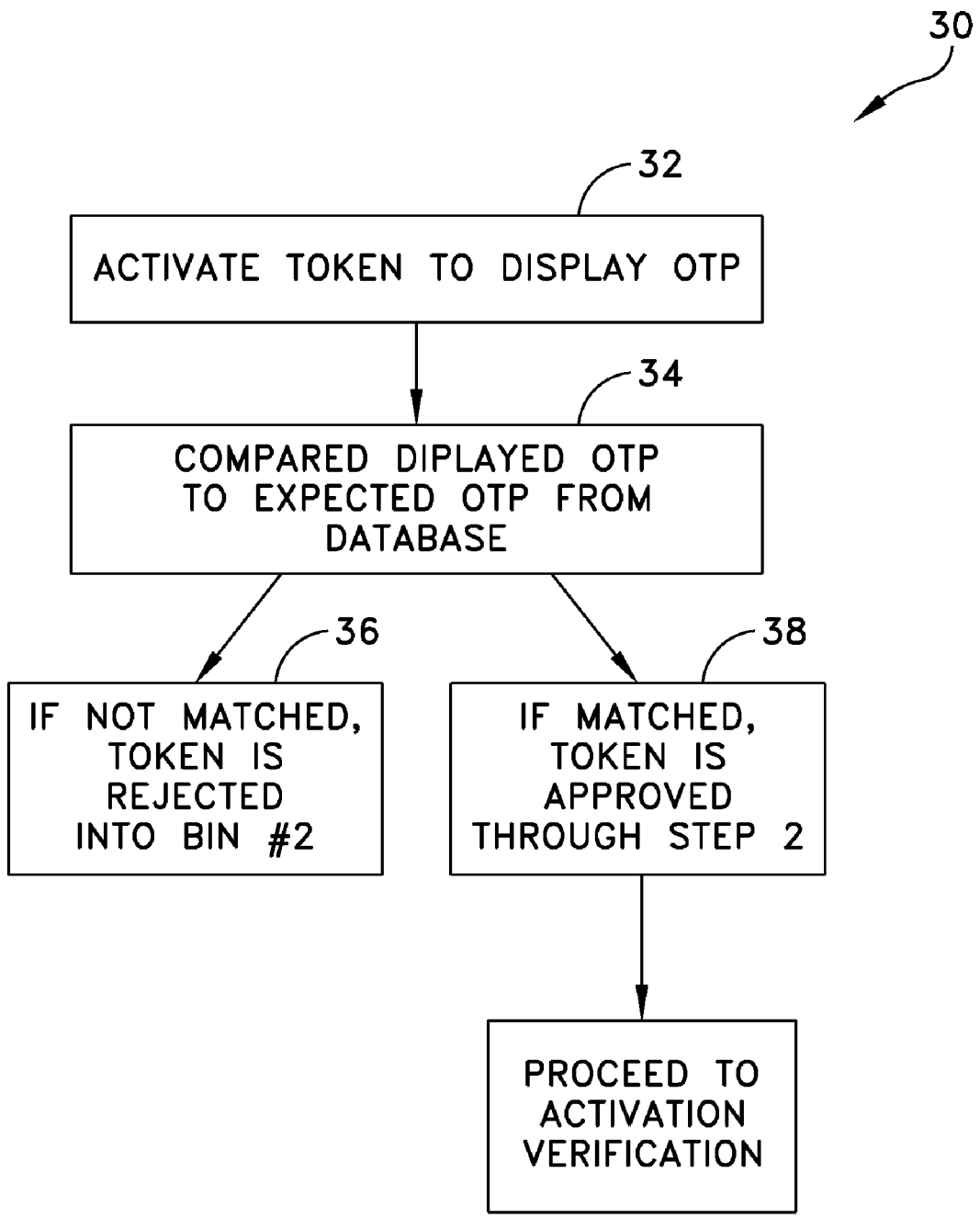
FIG. 3 is block diagram illustrating the process for verifying one-time passcodes during authentication token testing.
Figure 4:
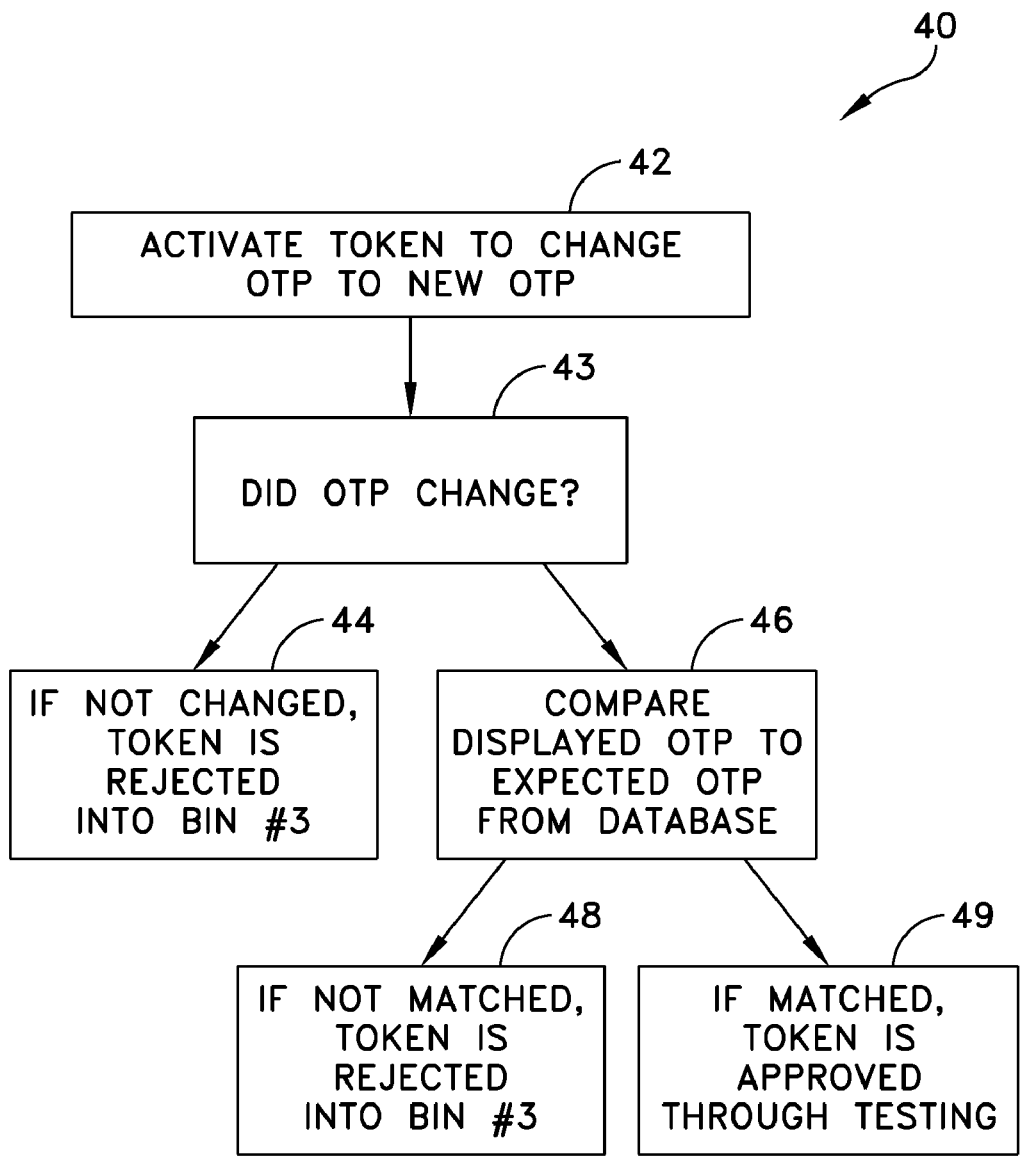
FIG. 4 is block diagram illustrating the process for verifying token activation during authentication token testing.

As illustrated in FIG. 3, a second procedure 30 for testing authentication tokens is illustrated. During this phase, the OTP 17 displayed by the token 12 is verified against the anticipated OTP of the token identified by the database. In the initial step 32 the token is activated to display the OTP. The OTP 17 displayed in window 15 is then compared to the expected value of the OTP in the database 34. If the OTP that is displayed does not match the OTP in the database, then the token is rejected and placed into a second rejection bin in step 36. If, however, the OTP that is displayed does match the OTP in the database in step 34, then the token is approved in step 38 and may be moved to the next testing phase.

In the final testing procedure 40, the activation of the token 12 is tested. In particular, although the initial OTP has been confirmed in phase 30, issues may still exist with respect to the physical device, including the actuation button. In order to test for such potential issues, the token is again activated to display a new OTP in step 42. The OTP is read and compared to the previous OTP to see if there has been a change in step 43. If there has not been a change in the OTP, then the token is rejected and placed into a third rejection bin in step 44. If the OTP has changed, then the next step 46 is to compare the OTP 17 displayed in window 15 to the expected value of the OTP in the database. If the OTP that is displayed does not match the OTP in the database, then the token is rejected and placed either into the third rejection bin or a fourth rejection bin in step 48. If, however, the OTP that is scanned does match the OTP in the database, then the token is approved in step 49 and the testing may be completed. Alternatively, other test procedures may be included before testing is completed.

The rejected tokens placed in the multiple bins may be further tested to determine the particular failure, as needed. The use of multiple bins allows type of failure that has occurred with respect to the tokens within the particular bins to be readily identified. For example, the tokens placed within the first bin are not properly matched to their unique serial number stored in the database while those in the second bin, while properly matched, are out of sync with the expected OTP. While tokens that are placed in the third bin may have a broken actuation button 13 resulting in an OTP that does not change.

Figure 5:
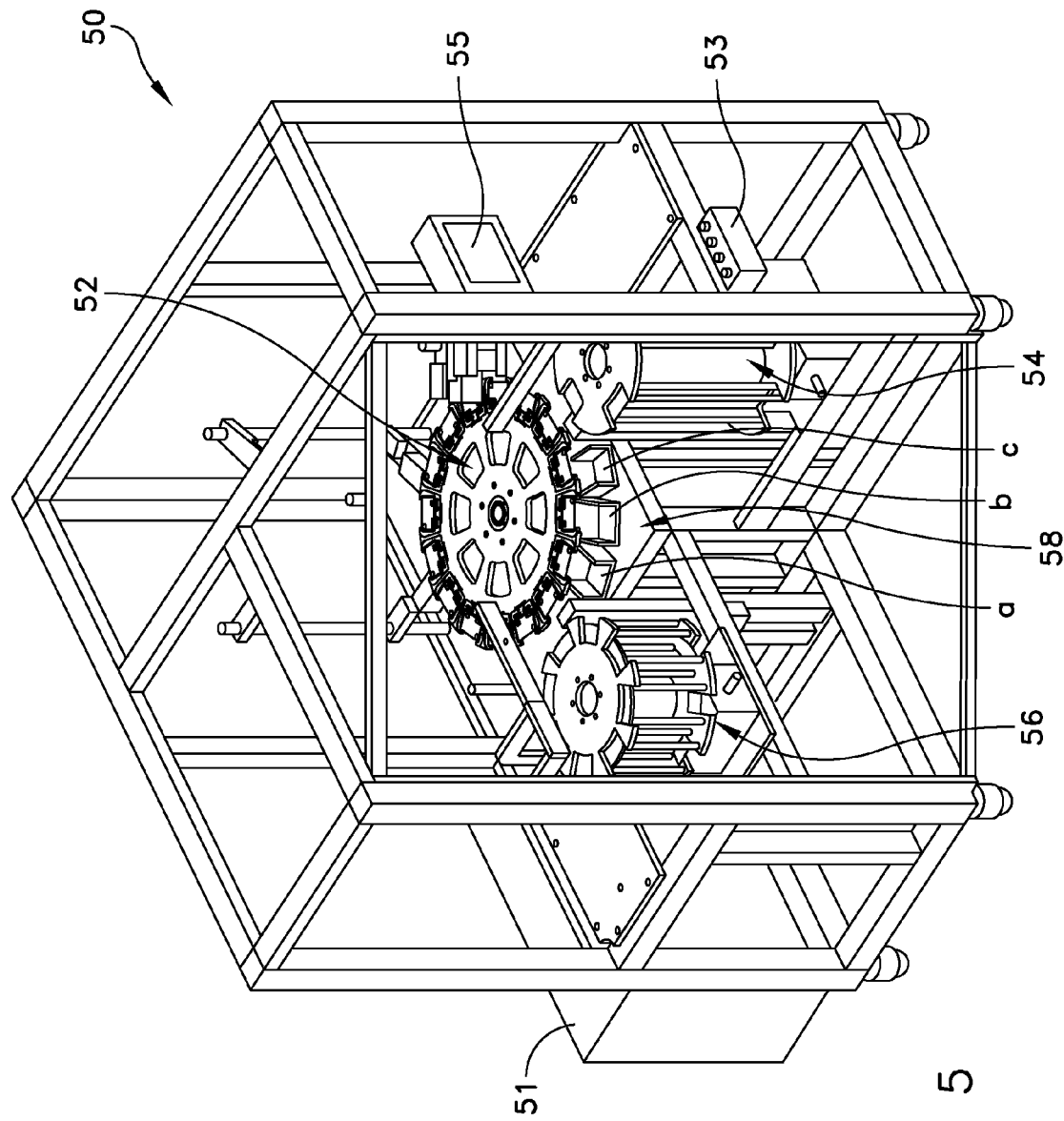
FIG. 5 is perspective view of an exemplary token testing device for testing authentication tokens according to the process of FIGS. 2-4.

Automation of the test procedure described herein allows for real time testing of the tokens which helps to timely identify potential issues so that production and shipping of defective tokens can be avoided. Robotics are preferably used for testing the tokens in order to minimize human error and to allow for large batches of tokens to be tested quickly. Referring now to FIGS. 5 and 6, an exemplary device 50 for automated testing of the authentication tokens 12 is illustrated. Device 50 includes a testing table 52 for supporting and moving the tokens during the various testing phases, an input table 54 for supplying the tokens to be tested, an output table 56 for collecting tokens that have passed testing and a reject table 58 for removing rejected tokens. The device 50 may also preferably include an electronic control box 51 for controlling the electrical operations, an input controller 53 for inputting various desired parameters, for example (number of display digits, duration between passcodes, and token lifetime), and a display 55 which can be viewed by an operator overseeing the testing operations. A card actuator (not shown) may also be provided for lifting the cards onto input table 54. As best illustrated in FIG. 6, testing table 52 is a rotary table that includes stations 59 along the circumference of the table that support the tokens for rotation around a central axis "X" during use and into multiple positions 60a-60p. In the present embodiment, the stations are illustrated in an initial, or start position and will be described as rotating in a counter-clockwise manner, in the direction of arrow "A", through various testing positions, although clockwise rotation is also contemplated. As will be appreciated, the use of rotary tables as described herein allows for a smaller shop footprint for the testing of the tokens, provides a compact station that can be placed in locations with space restrictions without interfering with other equipment, and allows the operator to see the majority of the components in the testing device during operation. However, other types of tables, for example a vertical hopper for inputting the tokens, may also be utilized as would be known to those of skill in the art.

The token 12 is first placed into position 60a from the input table 54 (FIG. 5). If the token has not already been programmed prior to receipt into position 60a, it may also be programmed at this position. Position 60b is left without a function in the present embodiment to allow for future secondary programming or other testing steps. The token is then rotated into position 60c where a scanner, which may be supported above the table, reads the RFID tag and compares it to the expected serial number in the database. If the two match, the token is then moved into position 60d where the token is activated, for example by depressing button 13 to produce an OTP 17.

The OTP is then read in position 60f, which may be done by an overhead camera or scanner, and the displayed OTP 17 is compared to the expected OTP in the database. If the displayed OTP and the expected OTP match, the token is moved into position 60g where the token is again activated, and into position 60i where the displayed OTP is again read by the overhead camera and is compared to both the prior OTP to ensure that the OTP has changed, and to the expected OTP in the database.

Position 60*j* is provided to engrave the serial number onto an outer surface of the token. By engraving the serial number during the test procedure the likelihood of an incorrect serial number being engraved on the card is reduced. If the token already has a serial number, it may be confirmed optically in position 60*k*, which can be done from below the table if the serial number, or barcode, is disposed on the back of the token. Again, confirming the serial number optically, in addition to the previous RFID authentication undertaken in position 60*c* reduces the likelihood of an incorrect serial number.

Once the token has passed testing it is moved in output position 60*m* and transferred to the output table 56. If at any time during testing the token fails one of the tests, it is moved to one of the reject positions 60*n-p*, and transferred to the reject table 58 where it is deposited into one of reject bins 58*a*, 58*b*, 58*c*, depending upon the test that it failed. For example, position 60*n* may for failed RFID authentication in which case the token would be deposited into a first bin. Or, if the token failed for confirmation of the first displayed OTP, it could be moved into position 60*o* and deposited into the second bin. Likewise, if the token fails the second displayed OTP test, it could be moved into position 60*p* and deposited into the third bin, as described hereinabove. In this manner, the number of tokens that fail a particular test can be readily identified for quality control purposes.

As will be noted, additional positions are provided in the embodiment of FIG. 5 for allowing other procedures or tests, in addition to the testing described herein above, to take place. For example, positions 60*e*, 60*h*, and 60*l* have been left open to allow for further expansion of the table, as may be desired.

While various embodiments of the invention have been particularly shown and described, it will be understood by those skilled in the art that various changes in form and details may be made therein without departing from the spirit and scope of the invention as defined by the appended claims.

For example, the tokens disclosed herein are provided as exemplary embodiments and tokens having other shapes, sizes and features may be provided, as would be known to those of skill in the art. In addition, one or more testing steps may be added or eliminated without departing from the spirit and scope of the invention as defined by the appended claims. Also, the rotary testing table described herein may be modified to a non-rotary arrangement, for example into a linear conveyor arrangement. Likewise, the drawings provided are not to be construed as limiting, but as exemplary embodiments.

What is claimed is:

1. A method for testing authentication tokens that produce a one-time passcode (OTP) from an encryption in a database, the method comprising:
   providing a token having a body housing an internal serial number, an activation member supported on the token body and constructed and arranged to trigger the production of the OTP, and a display window constructed and arranged to display the OTP to a user;
   performing an initial testing procedure including the steps of:
   a) scanning the internal serial number;
   b) comparing the scanned internal serial number to an expected serial number stored in the database;
   performing OTP authentication testing including the steps of:
   c) initiating the activation member to trigger the production of a first produced OTP in the display window;
   d) comparing the first produced OTP to a first expected OTP stored in the database; and
   wherein if both the scanned internal serial number and the expected serial number match and the first produced OTP and the first expected OTP match, the authentication token passes initial testing and OTP authentication testing.

2. The method of claim 1, further comprising the steps of:
   performing OTP verification testing including the steps of:
   d) initiating the activation member to trigger the production of a second produced OTP;
   e) comparing the second produced OTP to the first produced OTP;
   wherein if the first produced OTP and the second produced OTP are different, the authentication token passes OTP verification testing.

3. The method of claim 2, further comprising the step of:
   comparing the second produced OTP to a second expected OTP in the database and wherein if the second produced OTP and the second expected OTP match, the authentication token passes testing.

4. The method of claim 3, further comprising the step of rejecting tokens whose second produced OTP and second expected OTP do not match into a third bin.

5. The method of claim 2, further comprising the step of rejecting tokens whose first produced OTP and second produced OTP match into a third bin.

6. The method of claim 1, further comprising the step of engraving the serial number onto the token body.

7. The method of claim 1, further comprising the step of optically reading the serial number on the token body.

8. The method of claim 1, further comprising the step of rejecting tokens whose scanned internal serial number and the expected serial number do not match into a first bin.

9. The method of claim 1, further comprising the step of rejecting tokens whose first produced OTP and first expected OTP do not match into a second bin.

10. The method of claim 1, wherein the internal serial number is disposed in a radio frequency identification tag.

11. The method of claim 1, wherein the activation member is a button constructed and arranged to be depressed by a user to trigger the OTP.

12. A method for testing authentication tokens that produce a one-time passcode (OTP) from an encryption in a database, the method comprising:
   providing a token having a body that houses an internal serial number, and an activation member constructed and arranged to trigger the production of the OTP;
   providing a testing table constructed and arranged to move the token into various positions during different testing phases, and including a plurality of stations constructed and arranged to hold the token during testing;
   placing the token into one of the plurality of stations in a first position;
   performing an initial testing procedure including the steps of:
   a) scanning the internal serial number;
   b) comparing the scanned internal serial number to an expected serial number stored in the database; and
   wherein if the scanned internal serial number and the expected serial number match, the authentication token passes the initial testing procedure.

13. The method of claim 12, further comprising the steps of:
   moving the token into a second position;
   performing OTP authentication testing including the steps of:

c) initiating the activation member to trigger the production of a first produced OTP;
d) comparing the produced OTP to a first expected OTP stored in the database; and
wherein if both the first produced OTP and the first expected OTP match, the authentication token passes OTP authentication testing.

14. The method of claim 13, wherein the token further comprises a display window constructed and arranged to display the first produced OTP to a user.

15. The method of claim 13, further comprising the steps of:
moving the token into a third position;
performing OTP verification testing including the steps of:
e) initiating the activation member to trigger the production of a second produced OTP;
f) comparing the second produced OTP to the first produced OTP;
wherein if the first produced OTP and the second produced OTP are different, the authentication token passes OTP verification testing.

16. The method of claim 12, further comprising the steps of:
moving the token into a fourth position; and
engraving the serial number onto the token body.

17. The method of claim 12, further comprising the steps of:
moving the token into a fifth position; and
optically reading the serial number on the token body.

18. The method of claim 12, wherein the activation member is a button constructed and arranged to be depressed by a user to trigger the OTP.

19. The method of claim 12, wherein the testing table is a rotary table.

* * * * *